(12) United States Patent
Yeh et al.

(10) Patent No.: US 11,290,847 B2
(45) Date of Patent: Mar. 29, 2022

(54) ELECTRONIC DEVICE AND METHOD FOR IMPROVING SMOOTHNESS AND PRECISION OF POSITIONING

(71) Applicant: Quanta Computer Inc., Taoyuan (TW)

(72) Inventors: Shu-Wei Yeh, Taoyuan (TW); Po-Shan Kao, Taoyuan (TW); Chiao-Wei Lu, Taoyuan (TW); Wan-An Yang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/014,398

(22) Filed: Sep. 8, 2020

(65) Prior Publication Data

US 2021/0400435 A1 Dec. 23, 2021

(30) Foreign Application Priority Data

Jun. 17, 2020 (TW) .................................. 109120307

(51) Int. Cl.
| | |
|---|---|
| *H04W 4/02* | (2018.01) |
| *H04W 4/029* | (2018.01) |
| *G01S 5/06* | (2006.01) |
| *G01S 3/48* | (2006.01) |
| *H04W 4/33* | (2018.01) |

(52) U.S. Cl.
CPC ................ *H04W 4/027* (2013.01); *G01S 3/48* (2013.01); *G01S 5/06* (2013.01); *H04W 4/029* (2018.02); *H04W 4/33* (2018.02)

(58) Field of Classification Search
CPC ....... H04W 4/027; H04W 4/33; H04W 4/029; G01S 3/48; G01S 5/06
See application file for complete search history.

(56) References Cited

U.S. PATENT DOCUMENTS

| 2015/0215742 A1* | 7/2015 | Ikeda | H04W 68/02 |
| | | | 455/456.1 |
| 2019/0182627 A1* | 6/2019 | Thoresen | H04W 4/022 |

FOREIGN PATENT DOCUMENTS

| CN | 102663771 A | 9/2012 |
| CN | 105611627 A | 5/2016 |

OTHER PUBLICATIONS

Chinese language office action dated Mar. 4, 2021, issued in application No. TW 109120307.

* cited by examiner

*Primary Examiner* — Srilakshmi K Kumar
*Assistant Examiner* — Umair Ahsan
(74) *Attorney, Agent, or Firm* — McClure, Qualey & Rodack, LLP

(57) ABSTRACT

An electronic device includes an indoor positioner and a positioning engine server. The indoor positioner has an array antenna to receive a wireless signal from user equipment, and to calculate the angle of arrival (AOA) of the wireless signal according to the phase difference and the time difference. The wireless signal includes status data of the user equipment. The positioning engine server converts the angle of arrival into a set of coordinates that correspond to a position of the user equipment, and inputs the set of coordinates to an IMM module. The IMM module includes a first state module and a second state module. The IMM module calculates weighting values for the first state module and the second state module according to the status data of the user equipment, and outputs an estimated set of coordinates according to the set of coordinates and the weighting values.

9 Claims, 4 Drawing Sheets ically transmits Bluetooth beacons. The sensor 110, for
ELECTRONIC DEVICE AND METHOD FOR IMPROVING SMOOTHNESS AND PRECISION OF POSITIONING

CROSS REFERENCE TO RELATED APPLICATIONS

This application claims priority to and the benefit of Taiwan Application No. 109120307, filed on Jun. 17, 2020, the entirety of which is incorporated by reference herein.

FIELD OF THE INVENTION

The invention relates to an electronic device, especially one relating to improving the smoothness and precision of positioning.

DESCRIPTION OF THE RELATED ART

Indoor positioning tags mainly continuously transmit wireless signals through their own wireless signal transmitters, and the wireless signals are received by indoor positioning wireless receivers. The indoor positioning wireless receivers transfers data included in the received wireless signals to a back-end positioning engine server to calculate positions of the indoor positioning tags. However, there are often errors in the positioning process. A common method is to add a Kalman filter (KF) to the positioning engine server, so that the positioning can be smoother and more accurate.

However, during the movement of an object equipped with an indoor positioning wireless tag, the object may sometimes be stationary, and sometimes be moving (e.g., walking or running). In the scenario described above, a Kalman filter model is not suitable for the situation.

BRIEF SUMMARY OF THE INVENTION

In order to resolve the issue described above, an embodiment of the invention provides an electronic device. The electronic device includes an indoor positioner and a positioning engine server. The indoor positioner has an array antenna to receive a wireless signal from user equipment, and to calculate the angle of arrival (AOA) of the wireless signal according to the phase difference and the time difference. The wireless signal includes status data. The positioning engine server converts the angle of arrival into a set of coordinates that correspond to a position of the user equipment. The positioning engine server inputs the set of coordinates into an IMM module. The IMM module includes a first state module and a second state module. The IMM module calculates weighting values for the first state module and the second state module according to the status data of the user equipment, and outputs an estimated set of coordinates according to the set of coordinates and the weighting values.

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. The size of the components may be enlarged or reduced to provide clear illustration.

DETAILED DESCRIPTION OF THE INVENTION

Figure 1:
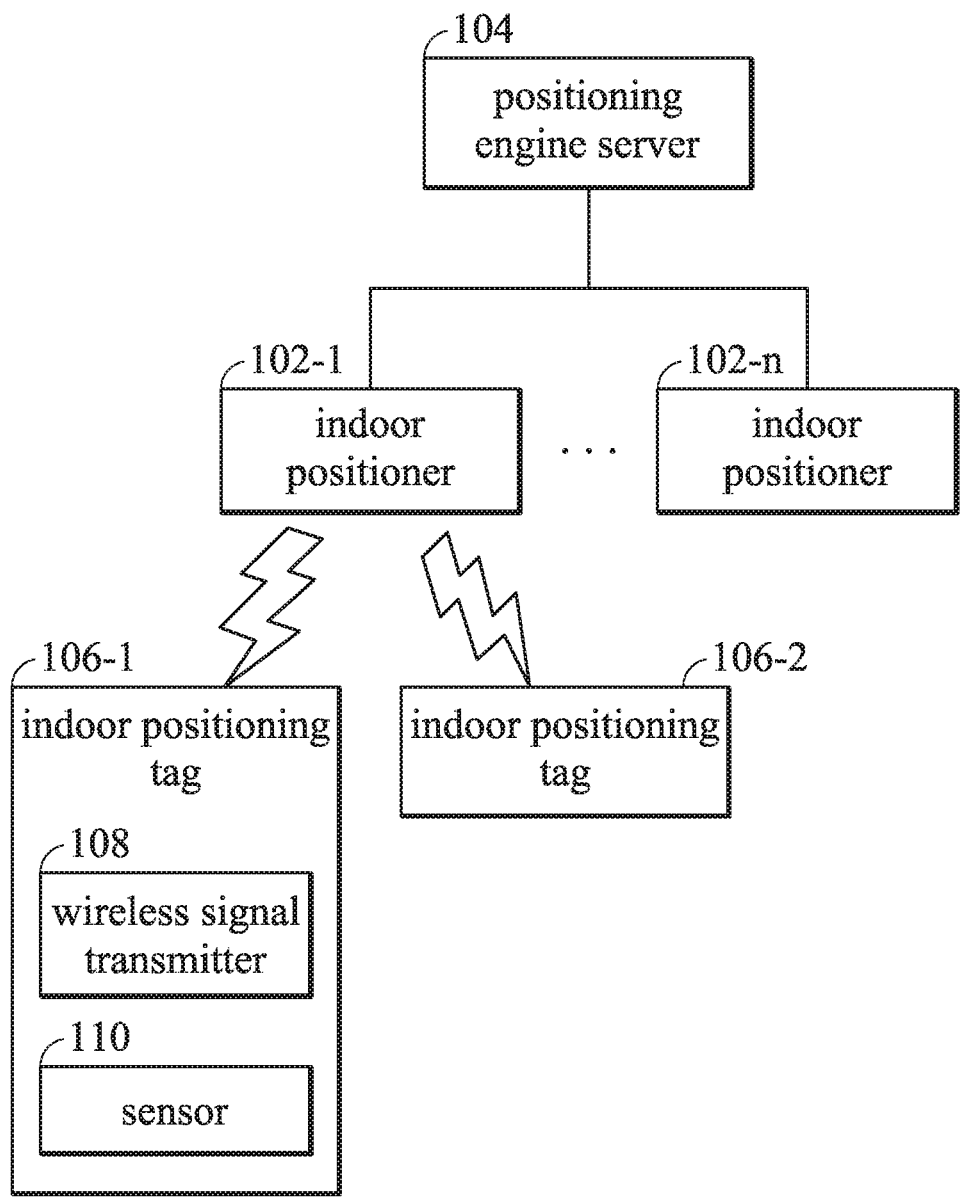
FIG. 1 shows a schematic diagram of an indoor positioning system in accordance with some embodiments of the disclosure.

FIG. 1 shows a schematic diagram of an indoor positioning system in accordance with some embodiments of the disclosure. As shown in FIG. 1, an indoor positioning system 100 includes a plurality of indoor positioners 102-1, 102-2, . . . , 102-n, a positioning engine server 104, and indoor positioning tags 106-1 and 106-2. In some embodiments, the number of indoor positioning tags is not limited to 2, and the present invention takes 2 indoor positioning tags as an example. Taking the indoor positioning tag 106-1 as an example, the indoor positioning tag 106-1 has a wireless signal transmitter 108 and a sensor 110. In some embodiments, the wireless signal transmitter 108 periodically transmits Bluetooth beacons. The sensor 110, for example, is an inertial measurement unit (IMU). When the wireless signal transmitter 108 transmits a Bluetooth beacon, the Bluetooth beacon includes current status data (including a motion state and a velocity direction of the indoor positioning tag 106-1) from the sensor 110, which is received by an array antenna of the indoor positioner 102-1.

In some embodiments, the indoor positioners 102-1, . . . , 102-n can be installed in different locations indoors (for example, in corridors, corners of walkways, stairs, or rooms). Each of the indoor positioners has an array antenna to receive the wireless signal transmitted from the indoor positioning tags 106-1, 106-2. The indoor positioners 102-1, . . . , 102-n convert the wireless signal to IQ sampling data. The IQ sampling data record sine wave intensity and phase variation of the wireless signal. The phase difference and time difference of the wireless signal received by the array antenna can be used to calculate the angles of arrival (AOA) of the indoor positioner tag 106-1 and 106-2 relative to the indoor positioner (i.e. the angle of incidence of the wireless signal transmitted from the indoor positioner tag 106-1 and 106-2). The indoor positioners 102-1, . . . , 102-n further sends information of the angles of arrival to the positioning engine server 104.

The positioning engine server 104 executes (1) a packet receiving subroutine, (2) an angle of arrival (AOA) data processing subroutine, (3) a position filtering subroutine, and (4) a smoothing subroutine. As shown in FIG. 1, after indoor positioners 102-1, . . . , 102-n convert the received wireless signal (for example, Bluetooth beacons) to data of angles of arrival (AOA data), and further send the AOA data to the positioning engine server 104. The (1) packet receiving subroutine receives the AOA data firstly, then the (2) AOA data processing subroutine converts the AOA data into a corresponding set of coordinates. Finally, the (3) position filtering subroutine and the (4) smoothing subroutine filter the coordinates by recursive filtering to improve the smoothness and precision of the coordinates.

Figure 2:
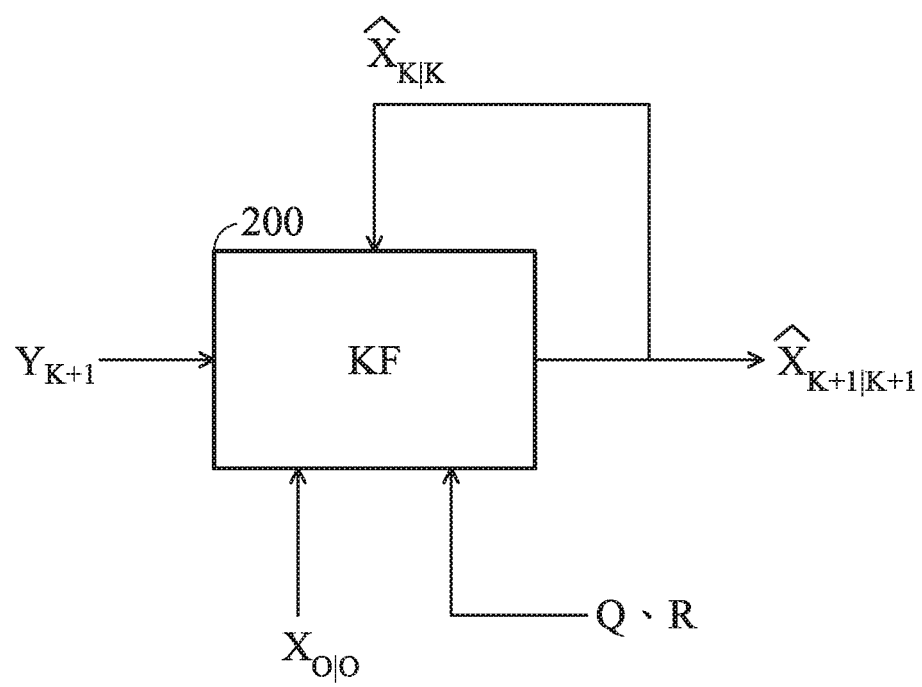
FIG. 2 shows a schematic diagram of an operation of a Kalman filter in accordance with some embodiments of the disclosure.

In the (4) smoothing subroutine, the positioning engine server 104 first executes an interacting multiple model (IMM) algorithm to generate an IMM module. After that, the positioning engine server 104 inputs the set of coordinates from the (2) AOA data processing subroutine into the IMM module. The IMM module is based on Kalman filters (KF). In other words, the IMM module consists of multiple Kalman filters. FIG. 2 shows a schematic diagram of a Kalman filter (KF) 200 in accordance with some embodiments of the disclosure. As shown in FIG. 2, Kalman filter 200 is an optimal linear minimum mean square error estimator developed in a state space mode as a recursive filtering. The characteristic of Kalman filter 200 is that it does not store data in the past iteration sampling time point. Kalman filter 200 obtains the current state estimation (such as $\hat{X}_{k+1|k+1}$ in FIG. 2) through the iteration operation of the Kalman filter formula based on the current measured signal (such as $Y_{k+1}$ in FIG. 2 and the current set of coordinates of the indoor positioning tag 106-1 in FIG. 1) and the state estimation in the previous interaction sampling time point (such as $\hat{X}_{k|k}$ in FIG. 2). $X_{0|0}$ in FIG. 2 represents an initial value (or an initial coordinate) input to the Kalman filter.

In some embodiments, the initial value $X_{0|0}$ is an average value of 5 sets of coordinates from the (2) AOA data processing subroutine (but the present invention is not limited thereto), so that the estimated coordinates output by the Kalman filter can quickly approximate the input measured set of coordinates. Q in FIG. 2 is process noise during the recursive filtering process, and R in FIG. 2 is White Gaussian noise or measured noise during the recursive filtering process. In some embodiments, the precision and smoothness of the estimated set of coordinates output by the Kalman filter or IMM module can be adjusted by setting values of process noise Q and White Gaussian noise R.

The target object estimated by the Kalman filter (such as indoor positioning tags 106-1 in FIG. 1) is an object with single-state, i.e. moving or stationary state. If the moving/stationary state of the target object meets the model assumption of the Kalman filter, the tracking performance of the target object is optimal. When the motion state of the target object changes (for example, from the stationary state to the moving state, or from the moving state to the stationary state), the Kalman filter cannot immediately respond to the change of the motion state, resulting in poor tracking performance of the Kalman filter. At this time, IMM with two or more different state models can be used to respond to changes of the state by switching between the different state models.

In other words, IMM module (or IMM estimator) uses multiple Kalman filters to track a target object simultaneously, and takes into account the interaction between multiple state models by updating the respective weighting values of multiple Kalman filters. In target tracking, the most important feature of the IMM module is to iteratively update the probability of each state models by the received measured signal (such as $Y_{k+1}$ in FIG. 2). In addition, compared with single Kalman filter, the IMM module with the interaction between multiple state models is more adaptable to the changes in the motion state of the target object and more effective in tracking the target.

Therefore, when the (4) smoothing subroutine of the positioning engine server in FIG. 1 is executed, the IMM module, which includes a stationary module and a moving module, calculates and adjusts the weighting values assigned to the stationary module and the moving module according to status data (a motion state and a velocity direction) of the target (such as the indoor positioning tag 106-1). Besides, the IMM module calculates and outputs an estimated set of coordinates (such as $\hat{X}_{k+1|k+1}$ in FIG. 2) according to the set of coordinates from the (2) AOA data processing subroutine. In some embodiments, the stationary module of the IMM module is a Kalman filter, and the moving state module is another Kalman filter. In other words, the IMM module includes two Kalman filters. During the recursive operation of the IMM module, a first weighting value ($\mu_1$) can be calculated by the stationary module, and a second weighting value ($\mu_2$) can be calculated by the moving module. When user equipment is in a stationary state, the first weighting value ($\mu_1$) is larger than the second weighting value ($\mu_2$). When the user equipment is in a moving state, the second weighting value ($\mu_2$) is larger than the first weighting value ($\mu_1$). The sum of the first weighting value ($\mu_1$) and the second weighting value ($\mu_2$) is equal to 1. Generally, at a time point k+1, the IMM module calculates the first weighting value ($\mu_1$) of the stationary module using the following formula.

$$\mu_1(k+1) = \frac{1}{\bar{c}} p_{12} p_{11}(k+1)$$

where $\mu_1(k+1)$ is the first weighting value of the stationary module at time point k+1, $\bar{c}$ is a normalization constant, $p_{12}$ is the probability of transferring from the stationary module to the moving module, and $p_{11}(k+1)$ is the probability of staying in the stationary module at time point k+1.

At time point k+1, the IMM module calculates the second weighting value ($\mu_2$) of the moving module using the following formula.

$$\mu_2(k+1) = \frac{1}{\bar{c}} p_{21} p_{22}(k+1)$$

where $\mu_2(k+1)$ is the second weighting value of the stationary module at time point k+1, $\bar{c}$ is the normalization constant, $p_{21}$ is the probability of transferring from the moving module to the stationary module, and $p_{22}(k+1)$ is the probability of staying in the moving module at time point k+1. Since the probability (k+1) and $p_{22}(k+1)$ may be updated with each recursive filtering calculation during the recursive filtering calculation of the IMM module, the first weighting value ($\mu_1$) and the second weighting value ($\mu_2$) may also be updated with each recursive filtering calculation.

Refer to FIG. 2, at time point k+1, the stationary module outputs a first estimated set of coordinates $\hat{X}_{k+1|k+1}^1$ (not shown) according to the input measured signal or the input measured set of coordinates (such as $Y_{k+1}$ in FIG. 2). The moving module also outputs a second estimated set of coordinates $\hat{X}_{k+1|k+1}^2$ (not shown) according to the input measured signal or the input measured set of coordinates (such as $Y_{k+1}$ in FIG. 2). The estimated set of coordinates $\hat{X}_{k+1|k+1}$ are equal to the first estimated set of coordinates $\hat{X}_{k+1|k+1}^1$ multiplied by the first weighting value ($\mu_1$) plus the second estimated set of coordinates $\hat{X}_{k+1|k+1}^2$ multiplied by the second weighting value ($\mu_2$), that is $\hat{X}_{k+1|k+1} = \hat{X}_{k+1|k+1}^1 * \mu_1 + \hat{X}_{k+1|k+1}^2 * \mu_2$.

In details, refer to FIG. 2, the stationary module receives the set of coordinates of the user equipment (for example, the indoor positioning tag 106-1 in FIG. 1) at the current time point, and multiplies the set of coordinates by a first matrix to obtain the first estimated set of coordinates. The relationship between the set of coordinates, the first estimated set of coordinates, and the first matrix is expressed as follows in equation 1.

$$\hat{X}_{k+1|k+1}^{1} = \begin{bmatrix} x \\ y \\ z \\ v_x \\ v_y \\ v_z \end{bmatrix}_X = \Phi_{k+1}^{1} * Y_{k+1} + \begin{bmatrix} w_x \\ w_y \\ w_z \\ w_{v_x} \\ w_{v_y} \\ w_{v_z} \end{bmatrix} \quad \text{equation 1}$$

$$\Phi_{k+1}^{1} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix}$$

$\hat{X}_{k+1|k+1}^{1}$ is the first estimated set of coordinates at time point k+1. $Y_{k+1}$ is the input measured set of coordinates (i.e. the set of coordinates corresponding to the position of the user equipment at time point k+1). x, y, z are positions included in the first estimated set of coordinates. $v_x, v_y, v_z$ are velocities included in the first estimated set of coordinates; $w_x, w_y, w_z, w_{vx}, w_{vy}, w_{vz}$ are process noises or measuring noises. $\Phi_{k+1}^{1}$ is a state transpose matrix of the stationary module, that is, the first matrix. It is noted that since the stationary module does not need to consider the velocities in the input measured signal (such as $Y_{k+1}$ in FIG. 2), the values in fourth column and fourth row, fifth column and fifth row, and the sixth column and sixth row in the state transpose matrix $\Phi_{k+1}^{1}$ of the stationary module are all zero. In some embodiments, the precision and smoothness of the first estimated set of coordinates of the stationary module can be adjusted by setting values of $w_x, w_y, w_z, w_{vx}, w_{vy}, w_{vz}$.

In details, refer to FIG. 2, the moving module receives the set of coordinates of the user equipment (for example, the indoor positioning tag 106-1 in FIG. 1) at the current time point, and multiplies the set of coordinates by a second matrix to obtain the second estimated set of coordinates. The relationship between the set of coordinates, the second estimated set of coordinates, and the second matrix is expressed as follows in equation 2.

$$\hat{X}_{k+1|k+1}^{2} = \begin{bmatrix} x \\ y \\ z \\ v_x \\ v_y \\ v_z \end{bmatrix}_X = \Phi_{k+1}^{2} * Y_{k+1} + \begin{bmatrix} w_x \\ w_y \\ w_z \\ w_{v_x} \\ w_{v_y} \\ w_{v_z} \end{bmatrix} \quad \text{equation 2}$$

$$\Phi_{k+1}^{2} = \begin{bmatrix} 1 & 0 & 0 & dT & 0 & 0 \\ 0 & 1 & 0 & 0 & dT & 0 \\ 0 & 0 & 1 & 0 & 0 & dT \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

$\hat{X}_{k+1|k+1}^{2}$ is the second estimated set of coordinates at time point k+1. $Y_{k+1}$ is the input measured set of coordinates (i.e. the set of coordinates corresponding to a position of the user equipment at time point k+1). x, y, z are positions included in the second estimated set of coordinates. $v_x, v_y, v_z$ are velocities included in the second estimated set of coordinates; $w_x, w_y, w_z, w_{vx}, w_{vy}, w_{vz}$ are process noises or measuring noises. dT is a time interval of recursive sampling. $\Phi_{k+1}^{2}$ is a state transpose matrix of the moving module, that is, the second matrix. It is noted that since the moving module needs to consider the velocities in the input measured signal (such as $Y_{k+1}$ in FIG. 2), the values in fourth column and fourth row, fifth column and fifth row, and the sixth column and sixth row in the state transpose matrix $\Phi_{k+1}^{2}$ of the moving module are all one. In some embodiments, the precision and smoothness of the second estimated set of coordinates of the moving module can be adjusted by setting values of $w_x, w_y, w_z, w_{vx}, w_{vy}, w_{vz}$.

The following Table 1 shows matrixes required to be used and parameters required to be set during the recursive filtering calculation by the stationary module and the moving module of the IMM module in the present invention.

TABLE 1

| stationary module | moving module |
|---|---|
| $P_0 = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$ | $P_0 = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$ |
| $H = \begin{bmatrix} 1 & 0 & 0 & 0 & 0 & 0 \\ 0 & 1 & 0 & 0 & 0 & 0 \\ 0 & 0 & 1 & 0 & 0 & 0 \end{bmatrix}$ | $H = \begin{bmatrix} 1 & 0 & 0 & 0 & 0 & 0 \\ 0 & 1 & 0 & 0 & 0 & 0 \\ 0 & 0 & 1 & 0 & 0 & 0 \end{bmatrix}$ |
| $R_1 = \begin{bmatrix} 0.01 & 0 & 0 \\ 0 & 0.01 & 0 \\ 0 & 0 & 0.01 \end{bmatrix}$ | $R_2 = \begin{bmatrix} 0.09 & 0 & 0 \\ 0 & 0.09 & 0 \\ 0 & 0 & 0.09 \end{bmatrix}$ |

TABLE 1-continued

| stationary module | moving module |
|---|---|
| $Q_1 = \begin{bmatrix} \sigma_x^2 & 0 & 0 & 0 & 0 & 0 \\ 0 & \sigma_y^2 & 0 & 0 & 0 & 0 \\ 0 & 0 & \sigma_z^2 & 0 & 0 & 0 \\ 0 & 0 & 0 & \sigma_{v_x}^2 & 0 & 0 \\ 0 & 0 & 0 & 0 & \sigma_{v_y}^2 & 0 \\ 0 & 0 & 0 & 0 & 0 & \sigma_{v_z}^2 \end{bmatrix}$ | $Q_2 = \begin{bmatrix} \sigma_x^2 & 0 & 0 & 0 & 0 & 0 \\ 0 & \sigma_y^2 & 0 & 0 & 0 & 0 \\ 0 & 0 & \sigma_z^2 & 0 & 0 & 0 \\ 0 & 0 & 0 & \sigma_{v_x}^2 & 0 & 0 \\ 0 & 0 & 0 & 0 & \sigma_{v_y}^2 & 0 \\ 0 & 0 & 0 & 0 & 0 & \sigma_{v_z}^2 \end{bmatrix}$ |

$$\begin{bmatrix} p_{11} & p_{12} \\ p_{21} & p_{22} \end{bmatrix} = \begin{bmatrix} 0.97 & 0.03 \\ 0.03 & 0.97 \end{bmatrix}$$

As shown in Table 1, regardless of the stationary module or the moving module of the IMM module, the same identity matrix Po and the same measuring matrix H are used. The measuring matrix H is used to extract the x, y, and z components of the measured signal (for example, $Y_{k+1}$ in FIG. 2). In some embodiments, the Gaussian white noises $R_1$ and $R_2$ can be set as shown in Table 1 above. The White Gaussian noise $R_1$ means that the stationary module sets the range of each 10 cm (0.1 meter) in the x, y, and z axes as the respective allowable error range of x, y, and z, so that the system can obtain more accurate values of x, y, and z. Similarly, the White Gaussian noise $R_2$ means that the moving module sets the range of each 30 cm (0.3 meter) in the x, y, and z axes as the respective allowable error range of x, y, and z. It should be noted that the above error range is normal distribution.

As to process noises $Q_1$ and $Q_2$, the variation $\sigma_x^2$ represents the variation of the input measured signal (for example, $Y_{k+1}$ in FIG. 2) in the x direction. Similarly, the variation $\sigma_y^2$ represents the variation of the input measured signal in the y direction, and the variation $\sigma_z^2$ represents the variation of the input measured signal in the z direction. The variation $\sigma_{v_x}^2$ represents the variation of the input measured signal (for example, $Y_{k+1}$ in FIG. 2) in the x direction. Similarly, the variation $\sigma_{v_y}^2$ represents the variation of the input measured signal in the y direction, and the variation $\sigma_{v_z}^2$ represents the variation of the input measured signal in the z direction.

In some embodiments, the variations $\sigma_x^2$, $\sigma_y^2$ and $\sigma_z^2$ in the process noise $Q_1$ of the stationary module are set to 0.0004 (i.e. $(0.02)^2$), and the variations $\sigma_{v_x}^2$, $\sigma_{v_y}^2$ and $\sigma_{v_z}^2$ are set to 0. In some embodiments, the variations $\sigma_x^2$, $\sigma_y^2$ and $\sigma_z^2$ in the process noise $Q_2$ of the moving module are set to 0.0064 (i.e. $(0.08)^2$), and the variations $\sigma_{v_x}^2$, $\sigma_{v_y}^2$ and $\sigma_{v_z}^2$ are set to 0.04 (i.e. $(0.2)^2$).

In some embodiments, the present invention sets the initial probability of the module transferring possibility matrix $$\begin{bmatrix} p_{11} & p_{12} \\ p_{21} & p_{22} \end{bmatrix}$$

of the IMM module as $$\begin{bmatrix} 0.97 & 0.03 \\ 0.03 & 0.97 \end{bmatrix}.$$

In other words, during the recursive filtering calculation of the IMM module, the probability that the stationary module stays in the stationary module is preset to 0.97, the probability that the moving module stays in the moving module is preset to 0.97. The probability of transferring from the moving module to the stationary module is 0.03, and the probability of transferring from the stationary module to the moving module is 0.03. With the recursive filtering calculation of the IMM module, the IMM module updates the module transferring possibility matrix $$\begin{bmatrix} p_{11} & p_{12} \\ p_{21} & p_{22} \end{bmatrix}$$

between the stationary module and the moving module according to the input measured signal or the input measured set of coordinates (that is, $Y_{k+1}$ in FIG. 2) and weighting values (that is, the first weighting value ($\mu_1$) and the second weighting value ($\mu_2$).

Figure 3:
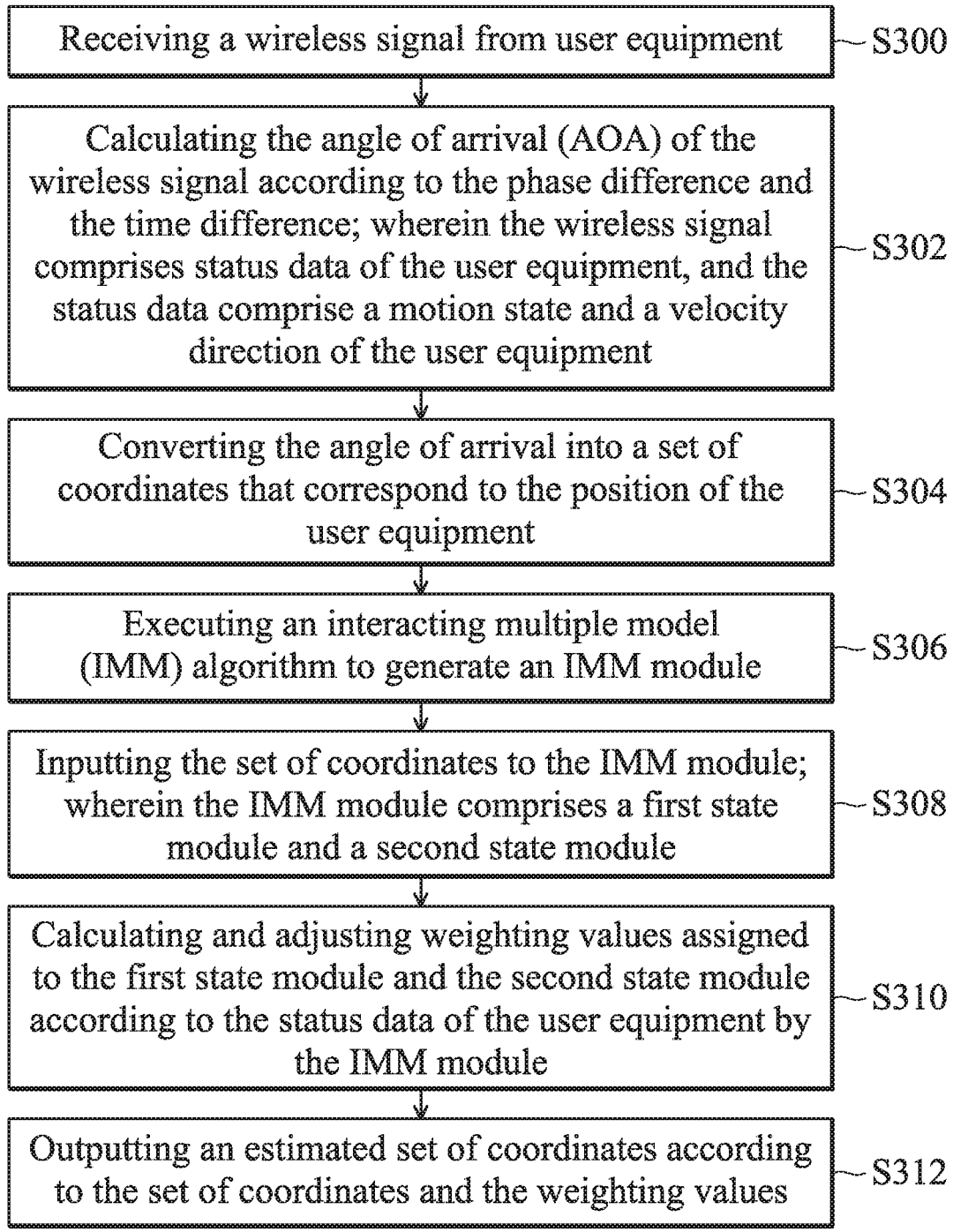
FIG. 3 shows a flow chart of a method for improving smoothness and precision of positioning in accordance with some embodiments of the disclosure.

FIG. 3 shows a flow chart of a method for improving smoothness and precision of positioning in accordance with some embodiments of the disclosure. As shown in FIG. 3, the method for improving smoothness and precision of positioning includes: receiving a wireless signal from user equipment (step S300); calculating the angle of arrival (AOA) of the wireless signal according to the phase difference and the time difference; wherein the wireless signal comprises status data of the user equipment, and the status data comprise a motion state and a velocity direction of the user equipment (step S302); converting the angle of arrival into a set of coordinates corresponding to the position of the user equipment (step S304); executing an interacting multiple model (IMM) algorithm to generate an IMM module (step S306); inputting the set of coordinates to the IMM module; wherein the IMM module comprises a first state module and a second state module (step S308); calculating and adjusting weighting values assigned to the first state module and the second state module according to the status data of the user equipment by the IMM module (step S310); and outputting an estimated set of coordinates according to the coordinate and the weighting values (step S312).

In some embodiments, the indoor positioner 102-1 in FIG. 1 executes the steps S300 and S302. The positioning engine server 104 in FIG. 1 executes the steps S304, S306, S308, S310 and S312. The positioning engine server 104 executes the steps S308, S310 and S312 through the IMM module. In some embodiments, the IMM module is stored in a storage of the positioning engine server 104. When the steps S308, S310, and S312 are executed, a processor of the positioning engine server 104 reads and executes the algorithm of the IMM module stored in the storage to achieve the purpose of improving smoothness and precision of positioning.

Figure 4:
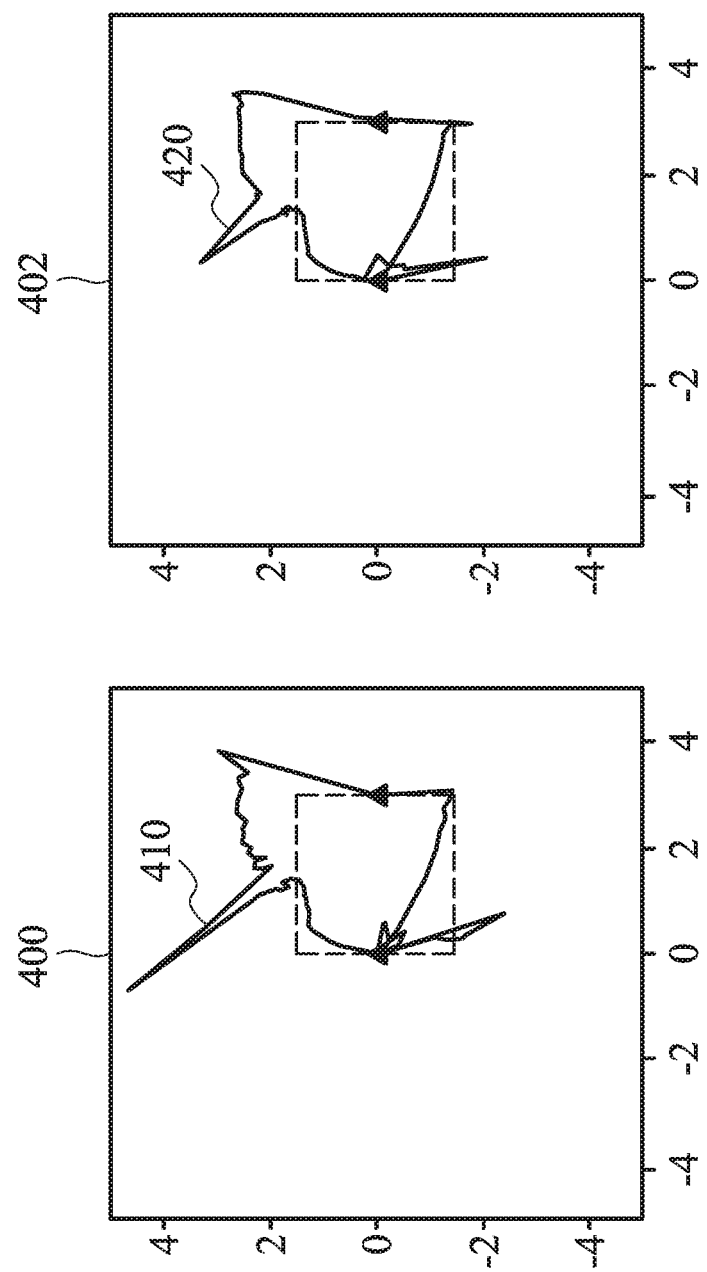
FIG. 4 shows a schematic diagram of a comparison between a measured set of coordinates $Y_{k+1}$ and an estimated set of coordinates $\hat{X}_{k+1|k+1}$ in accordance with some embodiments of the disclosure.

FIG. 4 shows a schematic diagram of a comparison between a measured set of coordinates $Y_{k+1}$ and an estimated set of coordinates $\hat{X}_{k+1|k+1}$ in accordance with some embodiments of the disclosure. As shown in FIG. 4, a measured set of coordinates FIG. 400 includes a path 410, and the path 410 is the path of the measured set of coordinates ($Y_{k+1}$ in FIG. 2) in time sequences. A measured set of coordinates FIG. 402 includes a path 420, and the path 420 is the path of the measured set of coordinates ($\hat{X}_{k+1|k+1}$ in FIG. 2) in time sequences. Obviously, the IMM module could smooth unreasonable sets of coordinate points. Through the interaction between the measured value and the estimated value of the IMM module, the optimal root-mean-square errors (RMSE) obtained by the IMM module will be relatively small.

The ordinals in the specification and the claims of the present invention, such as "first", "second", "third", etc., have no sequential relationship, and are just for distinguishing between two different components with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. Persons skilled in the art can make small changes and retouches without departing from the spirit and scope of the invention. The scope of the invention should be defined in accordance with the following claims and their equivalents.

What is claimed is:

1. An electronic device, comprising:
   an indoor positioner, having an array antenna to receive a wireless signal from an user equipment, and to calculate the angle of arrival (AOA) of the wireless signal according to the phase difference and the time difference; wherein the wireless signal comprises status data of the user equipment, and the status data comprise a motion state and a velocity direction of the user equipment;
   a positioning engine server, converting the angle of arrival into a set of coordinates corresponding to a position of the user equipment; wherein the positioning engine server inputs the set of coordinates into an interacting multiple (IMM) module;
   wherein the IMM module calculates weighting values for a first state module and a second state module of the IMM module according to the status data of the user equipment, and outputs an estimated set of coordinates according to the set of coordinates and the weighting values;
   wherein the first state module has a first weighting value, and the second state module has a second weighting value; when the user equipment is in a stationary state, the first weighting value is larger than the second weighting value; when the user equipment is in a moving state, the second weighting value is larger than the first weighting value.

2. The electronic device as claimed in claim 1, wherein the first state module and the second state module calculate the estimated set of coordinates at a current time point according to the set of coordinates at the current time point and the estimated set of coordinates at a previous time point.

3. The electronic device as claimed in claim 2, wherein the first state module outputs a first estimated set of coordinates, the second state module outputs a second estimated set of coordinates, and the estimated set of coordinates are equal to the first estimated set of coordinates multiplied by the first weighting value plus the second estimated set of coordinates multiplied by the second weighting value.

4. The electronic device as claimed in claim 1, wherein a sum of the first weighting value and the second weighting value is equal to 1.

5. The electronic device as claimed in claim 3, wherein the first state module obtain the first estimated set of coordinates through multiplying the set of coordinates at the current time point by a first matrix; a relationship between the set of coordinates at the current time point, the first estimated set of coordinates, and the first matrix is expressed in equation 1 below:

$$\hat{X}_{k|k}^1 = \begin{bmatrix} x \\ y \\ z \\ v_x \\ v_y \\ v_z \end{bmatrix}_X = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} Y_k + \begin{bmatrix} w_x \\ w_y \\ w_z \\ w_{v_x} \\ w_{v_y} \\ w_{v_z} \end{bmatrix} \quad \text{equation 1}$$

wherein $\hat{X}_{k|k}^1$ is the first estimated set of coordinates at time point k; $Y_k$ is the set of coordinates corresponding to the position of the user equipment at the time point k; x, y, z are positions included in the first estimated set of coordinates; $v_x$, $v_y$, $v_z$ are velocities included in the first estimated set of coordinates; $w_x$, $w_y$, $w_z$, $w_{vx}$, $w_{vy}$, $w_{vz}$ are process noises; and the first matrix is expressed as:

$$\begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix}.$$

6. The electronic device as claimed in claim 3, wherein the second state module obtain the second estimated set of coordinates through multiplying the set of coordinates at the current time point by a second matrix; a relationship between the set of coordinates at the current time point, the second estimated set of coordinates, and the second matrix is expressed in equation 2 below:

$$\hat{X}_{k|k}^2 = \begin{bmatrix} x \\ y \\ z \\ v_x \\ v_y \\ v_z \end{bmatrix}_X = \begin{bmatrix} 1 & 0 & 0 & dT & 0 & 0 \\ 0 & 1 & 0 & 0 & dT & 0 \\ 0 & 0 & 1 & 0 & 0 & dT \\ 0 & 0 & 0 & 1 & 0 & 0 \\ 0 & 0 & 0 & 0 & 1 & 0 \\ 0 & 0 & 0 & 0 & 0 & 1 \end{bmatrix} Y_k + \begin{bmatrix} w_x \\ w_y \\ w_z \\ w_{v_x} \\ w_{v_y} \\ w_{v_z} \end{bmatrix} \quad \text{equation 2}$$

wherein $\hat{X}_{k|k}^2$ is the second estimated set of coordinates at time point k; $Y_k$ is the set of coordinates corresponding to the position of the user equipment at time point k; x, y, z are positions included in the second estimated set of coordinates; $v_x$, $v_y$, $v_z$, are velocities included in the second estimated set of coordinates; $w_x$, $w_y$, $w_z$, $w_{vx}$, $w_{vy}$, $w_{vz}$ are process noises or measuring noises; and the second matrix is expressed as:

$$\begin{bmatrix} 1 & 0 & 0 & dT & 0 & 0 \\ 0 & 1 & 0 & 0 & dT & 0 \\ 0 & 0 & 1 & 0 & 0 & dT \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

where dT is a time interval of recursive sampling.

7. The electronic device as claimed in claim 1, wherein the IMM module updates a module transferring possibility between the first state module and the second state module according to the set of coordinates and the weighting values; wherein the module transferring possibility is:

$$\begin{bmatrix} p_{11} & p_{12} \\ p_{21} & p_{22} \end{bmatrix}$$

wherein $p_{11}$ is a possibility for staying in the first state module; $p_{12}$ is a possibility for transferring from the first state module to the second state module; $p_{21}$ is a possibility for transferring from the second state module to the first state module; and $p_{22}$ is a possibility for staying in the second state module.

8. A method, for improving smoothness and precision of positioning, comprising:
receiving a wireless signal from user equipment;
calculating the angle of arrival (AOA) of the wireless signal according to the phase difference and the time difference; wherein the wireless signal comprises status data of the user equipment, and the status data comprise a motion state and a velocity direction of the user equipment;
converting the angle of arrival into a set of coordinates corresponding to a position of the user equipment;
inputting the set of coordinates to an IMM module; wherein the IMM module comprises a first state module and a second state module;
calculating, by the IMM module, weighting values for the first state module and the second state module according to the status data of the user equipment; and
outputting an estimated set of coordinates according to the set of coordinates and the weighting values;
wherein the first state module has a first weighting value, and the second state module has a second weighting value; when the user equipment is in a stationary state, the first weighting value is larger than the second weighting value; when the user equipment is in a moving state, the second weighting value is larger than the first weighting value.

9. The method as claimed in claim 8, wherein the first state module and the second state module calculates the estimated set of coordinates at the current time point according to the set of coordinates at the current time point and the estimated set of coordinates at a previous time point.

* * * * *